J. G. VINCENT.
RADIATOR AND THERMOSTAT UNIT CONSTRUCTION.
APPLICATION FILED JUNE 26, 1916.
1,409,072.
Patented Mar. 7, 1922.
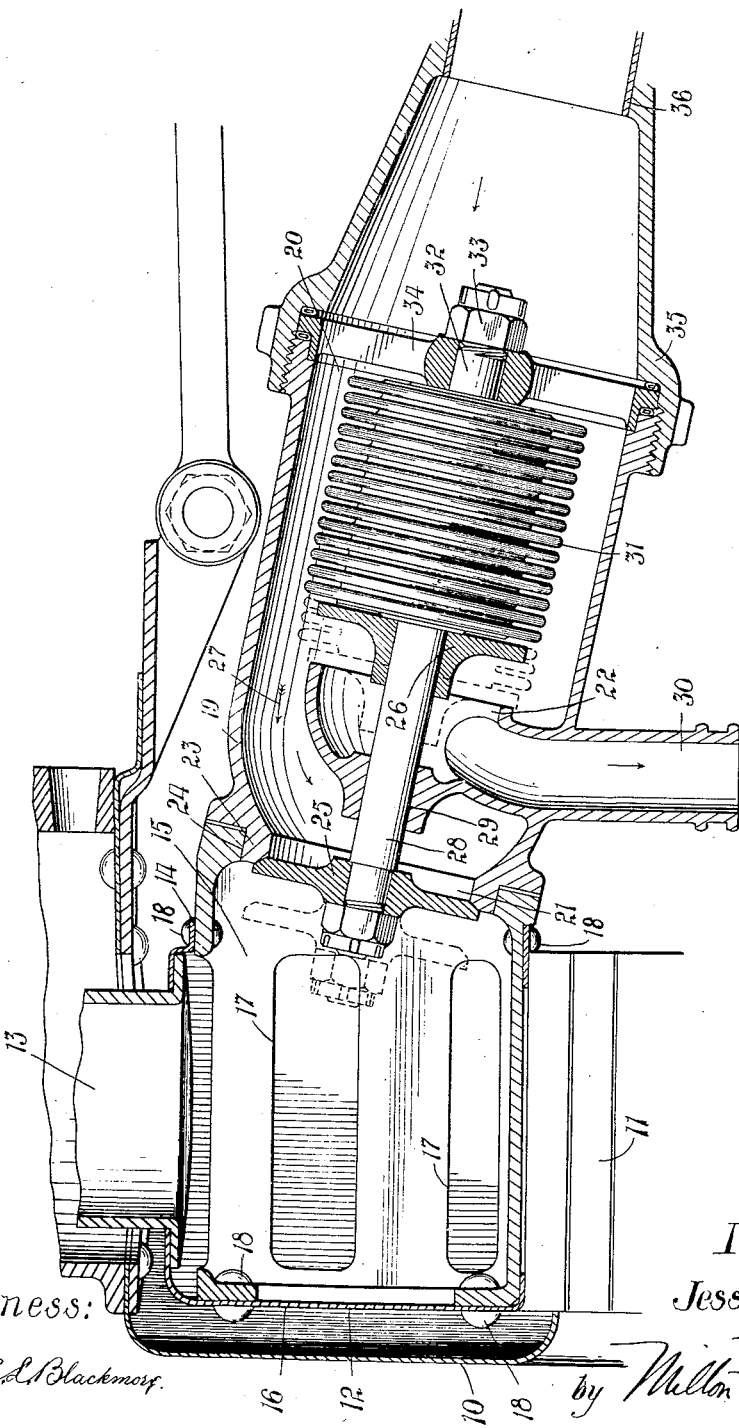
Witness:
J. C. L. Blackmore.
Inventor:
Jesse G. Vincent,
by Milton Tibbetts,
Atty.

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

RADIATOR AND THERMOSTAT UNIT CONSTRUCTION.

1,409,072.   Specification of Letters Patent.   Patented Mar. 7, 1922.

Application filed June 26, 1916. Serial No. 106,052.

*To all whom it may concern:*

Be it known that I, JESSE G. VINCENT, a citizen of the United States, and resident of Detroit, Wayne County, State of Michigan, have invented certain new and useful Improvements in Radiator and Thermostat Unit Constructions, of which the following is a specification.

This invention relates to motor vehicles and particularly to the water circulation system thereof.

One of the objects of the invention is to provide a novel arrangement of thermostat and valves for controlling the flow of water in the cooling system of a motor vehicle.

Another object of the invention is to provide a thermostat valve unit which may be easily placed in position and withdrawn.

Another object of the invention is to provide a thermostat valve device in which the main outlet valve of the device opens in the direction of the flow of the water therethrough.

Other objects of the invention will appear from the following description taken in connection with the drawing which forms a part of this specification, and in which the figure is a vertical section through a motor vehicle radiator and associated parts embodying this invention.

Referring to the drawings, 10 represents a radiator casing in which is mounted a radiator core 11 and an upper tank 12. A filler tube 13 for the radiator is connected to the tank 12 as shown.

The radiator tank is formed with an opening 14 in its rear wall and a hollow cylindrical bracket 15 extends through said opening to the front wall 16 of the tank. This bracket is provided with a series of openings 17 and it is secured to the tank 12 at both ends, as by the rivets 18. This bracket forms the water inlet for the tank 12 as well as a support for thermostat valve unit 19, which is adapted to control the flow of water into said tank.

This thermostat valve unit 19, in the form shown, is of substantially cylindrical form, having an inlet opening 20, a main outlet opening 21, and an auxiliary outlet opening or bypass opening 22. An annular flange 23 at the forward end of the casing fits in an opening 24 in the bracket 15 and is suitably secured to said bracket by bolts or other means not shown.

It will be seen that the inlet opening and two outlet openings are all arranged in alinement with each other, the inlet opening being at one end of the casing, the main outlet opening 21 at the other end of the casing, and the auxiliary outlet opening or bypass, 22, intermediate of the other openings. Also, in the form shown, the inlet opening 20 is practically unrestricted, whereas the outlet openings are controlled by valves 25 and 26 respectively of the poppet type. The valve 25 opens to the left, or in the direction of the arrow 27, which also indicates the direction of the flow of water through the casing. The valve 26, however, opens in the opposite direction or against the direction of flow of water through the casing. The tendency of the water passing through the casing, therefore, is to open the main valve 25, and thus pass a greater amount of water to the radiator 11.

The valves 25 and 26 are connected by a stem 28, which is guided in a boss 29 formed as an integral part of the casing 19, which part extends into the casing to form the auxiliary outlet opening 22 and the passage or bypass 30 with which said opening connects.

The stem 28 is also connected to and is operated by a thermostat 31 of any suitable construction being adapted to be expanded by heat and contracted by cold. The end of the thermostat 31 opposite to that which is connected to the stem 28, is rigidly secured as by a bolt 32 and nut 33 to a spider 34, which is secured between the rear end of the casing 19 and a coupling piece 35 mounted on a pipe 36 leading from the water jackets of a hydrocarbon motor.

It will be understood that the thermostat 31 is adapted to control the flow of water to the radiator upon which it is mounted. When the water in the system is cold the thermostat 31 is contracted as shown in full lines in the drawing and the main outlet valve 25 is closed and the auxiliary outlet valve 26 is opened. When the motor to which the device is connected is operated in this condition, the water will flow through the casing 19 and through the opening 22 into the bypass 30, where it is carried directly to the pump of the motor and recirculated. Thus no water passes to the radiator and the small amount of water in the motor jackets soon warms up and begins to expand the thermostat 31. This expansion is somewhat assisted by the pressure of water against the valve 25 and as the latter opens some of the water passes to the radiator and is cooled thereby. Soon an equilibrium is reached in which the required amount of water is passed to the radiator and the remainder flows through the bypass 30. When the maximum heated condition is reached the valves are in the position shown in dotted lines in the figure, the auxiliary opening 22 being entirely closed and the main opening 21 being wide open.

It will be understood that the thermostat valve unit may be assembled before it is connected to the bracket 15, and that it may be readily removed therefrom. When the unit has been removed from the bracket 15 it may be readily disassembled by unscrewing the nut which holds the valve 25 on the stem 28, taking off said valve 25, unscrewing the coupling piece 35 and removing the spider 34 and with it the thermostat 31, valve 26 and stem 28. The thermostat may be disconnected from the spider 34 by removing the nut 33.

Other forms may be made without departing from the spirit or scope of this invention.

Having thus described my invention, what I claim and desire to secure by Letters Patent is:—

1. A thermostat valve unit comprising a casing having an inlet opening, a main outlet opening, said openings being arranged at opposite ends of the casing, a bypass opening arranged between the inlet and the main outlet openings and facing said inlet opening, valves for the outlet opening and bypass opening and a thermostat normally connected to said valves for operating said valves.

2. A thermostat valve unit comprising a casing having an inlet and two outlet openings, valves for said outlet openings, one of said valves being arranged to open in the direction of the flow of water and the other being arranged to open against such flow, one of said valves opening as the other of said valves closes, and a thermostat normally connected to said valves for controlling the valves.

3. A thermostat valve unit comprising a casing having an inlet opening, a main outlet opening, and an auxiliary outlet opening, valves for said outlet openings, the valve for the main opening being arranged to open with the direction of the flow of water and the valve of the auxiliary opening being arranged to open against the direction of such flow as the other valve closes, and a thermostat positively connected to the valves to control said valves.

4. A thermostat valve unit comprising a casing having an inlet opening at one end, a main outlet opening at the other end and an intermediate auxiliary outlet opening, a poppet valve for the main outlet opening arranged to open away from its seat in the direction of flow of the water through the casing, a valve for the auxiliary opening arranged to open in the opposite direction and against the flow of water through the casing and a thermostat in the casing normally connected to the valves for controlling the position of said valves.

5. The combination with a radiator tank having an opening in one of its walls, of a bracket extending through said opening to the opposite wall and secured to both walls of said tank, and a thermostat unit connected to said bracket.

6. The combination with a radiator tank having an opening in one of its walls, of a hollow bracket extending through said opening to the opposite wall and secured to both walls of said tank, and a thermostat unit connected to discharge into said bracket.

7. The combination with a radiator tank having an opening in one of its walls, of a cylindrical bracket extending through said opening to the opposite wall of the tank, said bracket having openings in its side walls, means securing the ends of the bracket to the tank walls, and a thermostat unit connected to said bracket.

8. The combination with a radiator tank having an opening in one of its walls, of a cylindrical bracket extending through said opening to the opposite wall of the tank, said bracket having openings in its side walls, means securing the ends of the bracket to the tank walls, a thermostat casing having one end secured to said bracket, and a thermostat insertable into said casing at the other end.

9. A thermostat valve unit comprising a casing having an inlet opening at one end and an outlet opening at the other end, a detachable spider at one end of the casing, a thermostat secured to the spider and removable from the casing therewith, a valve for the opening opposite the spider end, a stem connecting said valve to the thermostat and a guide for said stem at the valve end of the casing between the valve and thermostat.

10. A thermostat valve unit comprising a casing having an inlet opening, a bypass conduit having an opening facing said inlet opening, a spider detachably carried by said casing and disposed in said inlet opening, a valve stem slidably mounted in said conduit and a thermostat connected to said spider and operatively connected to said stem.

11. A thermostat valve unit comprising a casing having an inlet opening, a bypass conduit having a cup shaped mouth facing said inlet opening, a spider detachably carried by said casing and disposed in said inlet opening, a valve stem slidably mounted in the cup shaped mouth of said conduit and a thermostat connected to said spider and operatively connected to said stem.

12. A thermostat valve unit comprising a casing having an inlet opening and a main outlet opening, said openings being arranged at opposite ends of said casing, a bypass conduit carried by said casing and having an opening disposed between said inlet and outlet openings and facing said inlet opening, a valve stem slidably mounted in said conduit, valves for said outlet openings carried by said stem and a thermostat operatively connected to said stem.

13. A thermostat valve unit comprising a casing having an inlet opening and a main outlet opening, said openings being arranged at opposite ends of said casing, a bypass conduit carried by said casing and having a cup shaped mouth portion disposed between said inlet and outlet openings and facing said inlet opening, a valve stem slidably mounted in the cup shaped portion of said conduit, valves for said outlet openings carried by said stem and a thermostat operatively connected to said stem.

14. A thermostat valve unit comprising a casing having an inlet opening, a boss carried by said casing and disposed in said inlet opening, a main outlet opening disposed at the opposite end of said casing from said inlet opening, a bypass conduit carried by said casing and having an opening disposed between said inlet and outlet openings and facing said inlet opening, a boss formed on said conduit, a valve stem slidably mounted in said bosses, valves for said outlet openings carried by said stem and a thermostat operatively connected to said stem.

In testimony whereof I affix my signature.

JESSE G. VINCENT.